(No Model.)

C. P. LEAVITT.
ROAD LOCOMOTIVE.

No. 299,150. Patented May 27, 1884.

Witnesses
J. J. Morrow
H. W. Young.

Inventor
Chas. P. Leavitt

UNITED STATES PATENT OFFICE.

CHARLES P. LEAVITT, OF MEMPHIS, TENNESSEE.

ROAD-LOCOMOTIVE.

SPECIFICATION forming part of Letters Patent No. 299,150, dated May 27, 1884.

Application filed October 5, 1883. (No model.)

*To all whom it may concern:*

Be it known that I, CHAS. PHILO LEAVITT, a citizen of the United States, residing at Memphis, in the county of Shelby and State of Tennessee, have invented a new and useful Improvement in Road-Locomotives, of which the following is a specification.

Heretofore, in the construction of steam-engines and other motors, a certain fixed ratio between the speed of the piston and that of the driving-wheel has been a necessity, growing out of the forms of mechanism heretofore known. Locomotives are made so their gearing may be altered to a certain extent; but this has to be done by an attendant.

The object of my invention is to connect the engine with the driving-wheels in such a manner that the speed of the engine and the power thereof may remain constant, no matter what may be the variation in the speed of the driving-wheels. It follows from this that the force upon the driving-wheels must increase as their speed diminishes, instead of remaining nearly a constant quantity, as heretofore. This invention, therefore, gives to machinery certain properties of changing the ratio of force and velocity in a given quantity of power, according to the resistance to be overcome—a property heretofore only exhibited in the muscular structure of animals, and supposed to be inseparably connected with intelligence. I attain these objects by the mechanism illustrated in the accompanying drawings, in which—

Figure 1:
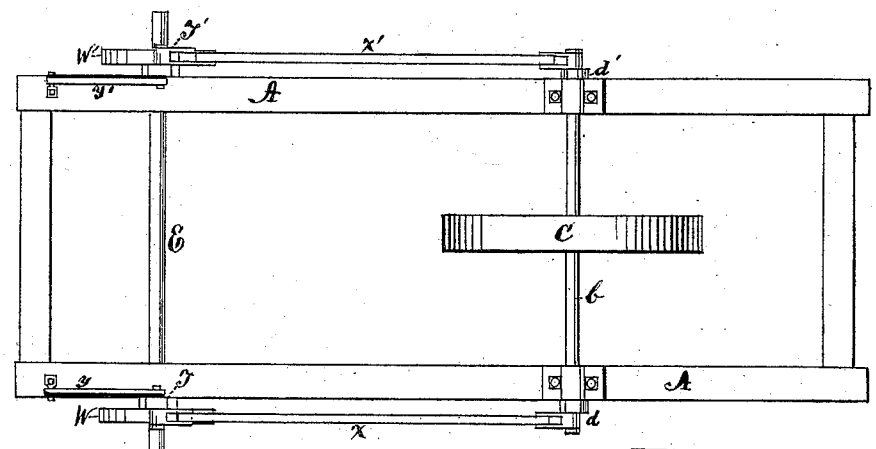
Figure 2:
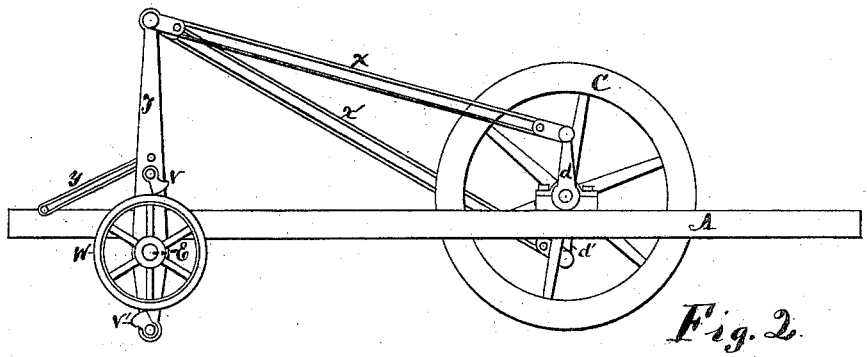

Figure 1 is a plan of my invention, and Fig. 2 a side elevation.

Similar letters refer to similar parts throughout the views.

In Fig. 1, A shows the frame of an ordinary road-locomotive without the parts that constitute no part of my invention. Whether the locomotive is driven by steam, hot air, or electricity, motion is given to the shaft $b$ by means of a belt from the motor running upon the fly-wheel $c$, or by any other suitable means. This shaft carries upon its extremities two cranks, $d$ and $d'$, placed at opposite angles with each other. In Fig. 2 may clearly be seen the manner in which these cranks connect with the main driven shaft E. This shaft has rigidly keyed to it the two plain wheels W and W', that are driven by the friction-pawls V and V', carried by the bars T and T'. These bars oscillate upon the shaft E as a center of motion, having a reciprocal motion from the cranks $d$ and $d'$, and consequently turning the shaft E by the ordinary and usual action of the friction-pawls V and V'. These pawls may of course be of any proper form, and might be even common ratchet-pawls working in ratchet-wheels.

Instead of making a rigid connection between the cranks $d$ and arms T, I use a spring, X, preferably made of rubber, as shown, for small vehicles; but any proper spring may be used. The springs X and X', connecting the arms T and T' with the cranks $d$ and $d'$, are of a strength to be determined by the amount of power to be transmitted. The small rubber springs Y and Y' connect with the arms T and T', for the purpose of drawing them back upon the idle or return stroke.

The operation of this device is as follows: The two cranks being opposite, one of the bars will be always moving forward under the combined action of the crank, the momentum of the bar, and the spring. Consequently the shaft E, upon which the driving-wheels of the locomotive may be placed, will always have a uniform movement on a uniform grade. In case the movement of the locomotive is altogether arrested by any obstacle, the bars T and T' cannot move. The engine, under these circumstances, does not stop, but continues to revolve under the action of the power. The springs X and X' are therefore extended and contracted an amount equal to the stroke of the crank at each revolution. Since the power required to extend the springs is substantially restored by their contraction, this action only consumes power through the friction generated by the strain of the parts, and the springs are made of such great power that at this point the whole power of the engine is absorbed in the friction, or nearly so. The strain meantime upon the driver is maximum and constant, for it is evident that as one spring slackens the other tightens, making their combined action uniform. This uniform forward pull exists under all circumstances when the resistance is material on the driving-wheels. The length of the springs is determined by their material. In case the drivers meet with only slight resistance, the arms T and T' move the full stroke of the cranks, or even a greater amount whenever the speed is great enough to make the maximum inertia of the bar exceed the power of the springs Y. If the stroke of the crank be one-foot and the power of the engine be twelve-foot pounds at each revolution on each crank, then the springs, when extended half their length, should have a power of two pounds. When extended eleven inches, the mathematical equation of power would require them to have a force of twelve pounds in order that the whole power of the engine be absorbed by one inch of motion; but, as stated, allowance must be made for increased friction at this point, so that the strain of twelve pounds would not be attained until the completion of the stroke, when the drivers do not move. The change of force from one pound to twelve is therefore about as great as can be obtained practically without compounding the system—that is, making the shaft E connect with another shaft corresponding to it, as it corresponds to $b$. In such a case the same result obtains as in compound levers, the variation becoming possible from one to one hundred and forty-four. This discovery, therefore, may be called that of "elastic leverage," and will be extremely useful in many ways, such as hoists working with irregular loads, machines for dredging and ditching, and, in fact, everywhere where the work is variable, and the speed may also be varied to suit it.

I do not confine myself to any particular kind or form of spring. The piston-and-cylinder atmospheric spring will be used in certain cases. Spiral springs of steel may be used, and even the bow-spring of wood. This device would be of little value with only one spring. More than two may be used with advantage when the presence of the fly-wheel is objectionable. This device requires for its perfect action, then, simply the introduction of a suitable spring between the reciprocating parts of a locomotive, where the final shaft is driven by pawls. The spring may be placed in any intermediate position when it transmits the power. It may be in the connecting-rod, as shown; or the arm T may itself be a bar-spring; or the spring may be interposed between the pawls and the bar T.

What I claim as my invention, and desire to secure by Letters Patent, is—

1. The springs X and X', the cranks $d$ and $d'$, the shaft $b$, the fly-wheel C, the arms T and T', the pawls V and V', the springs Y and Y', and the wheels W and W' upon the shaft E, combined, arranged, and operated substantially as described, and for the purpose set forth.

2. The springs Y and Y', in combination with the bars T T' and springs X and X', substantially as described, and for the purpose set forth.

CHAS. P. LEAVITT.

Witnesses:
J. J. MORROW,
R. W. YOUNG.